(12) United States Patent
Butler

(10) Patent No.: US 10,518,884 B1
(45) Date of Patent: Dec. 31, 2019

(54) AERIAL MARKSMAN RIG

(71) Applicant: Paul Butler, San Antonio, TX (US)

(72) Inventor: Paul Butler, San Antonio, TX (US)

( * ) Notice: Subject to any disclaimer, the term of this patent is extended or adjusted under 35 U.S.C. 154(b) by 24 days.

(21) Appl. No.: 15/813,005

(22) Filed: Nov. 14, 2017

Related U.S. Application Data

(60) Provisional application No. 62/421,812, filed on Nov. 14, 2016.

(51) Int. Cl.
*F41A 23/02* (2006.01)
*B64D 7/06* (2006.01)
*F41C 33/00* (2006.01)

(52) U.S. Cl.
CPC ............... *B64D 7/06* (2013.01); *F41A 23/02* (2013.01); *F41C 33/006* (2013.01)

(58) Field of Classification Search
CPC . B64D 7/06; F41A 23/02; F41A 23/00; F41C 33/006
USPC ........................................ 224/157; 89/37.16
See application file for complete search history.

(56) References Cited

U.S. PATENT DOCUMENTS 2,431,780 A * 12/1947 Theal ..................... A45F 3/14
224/157

\* cited by examiner

*Primary Examiner* — Reginald S Tillman, Jr.
(74) *Attorney, Agent, or Firm* — Pizarro Allen PC

(57) ABSTRACT

An aerial marksman rig includes a cross-leg, and may further include upright legs, secured to an airframe for stabilizing weapon use.

7 Claims, 10 Drawing Sheets

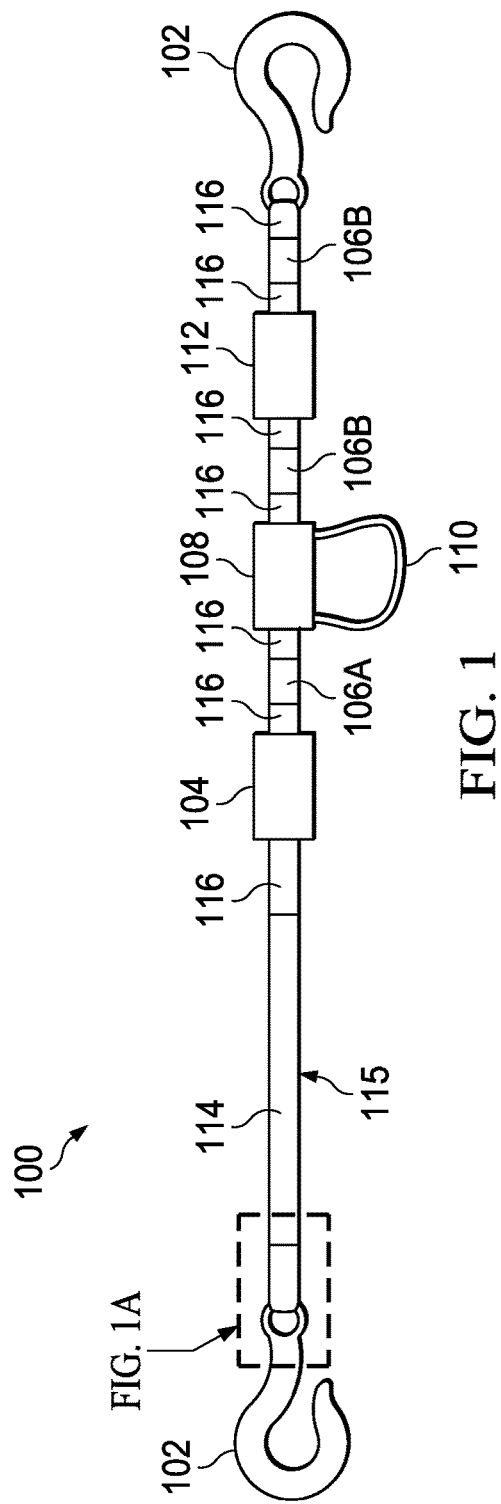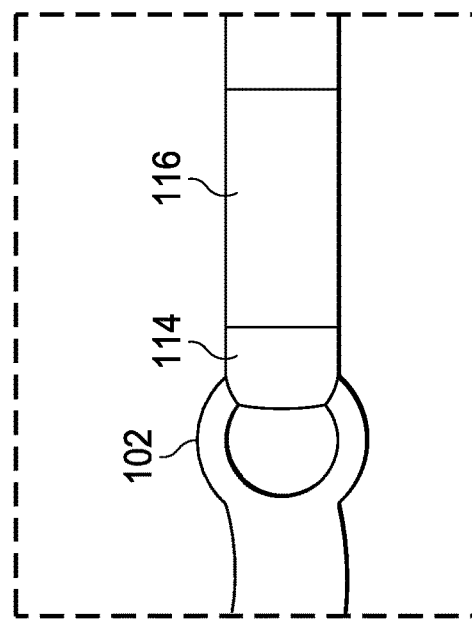

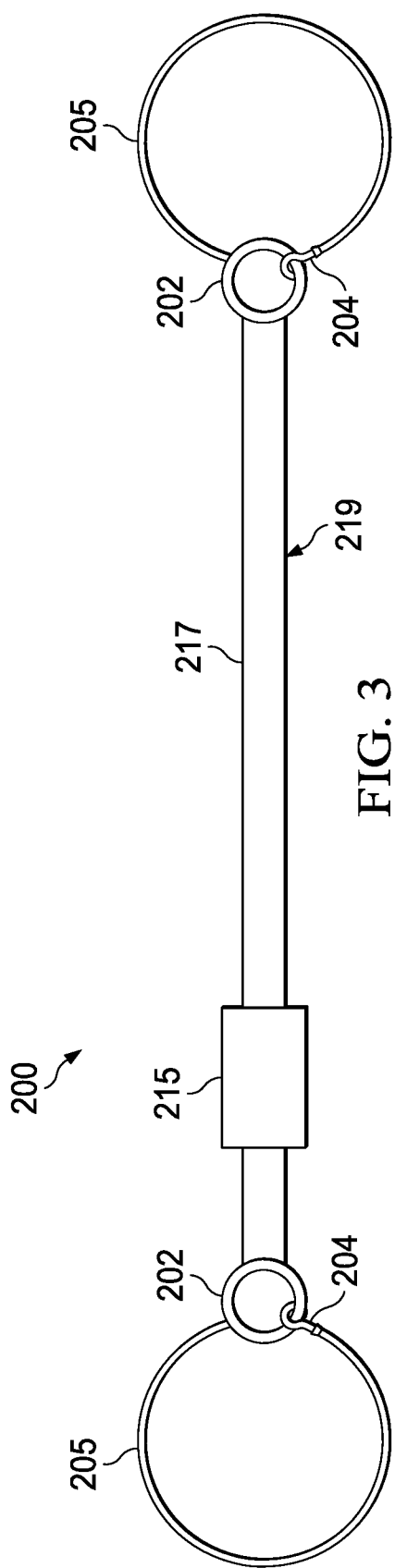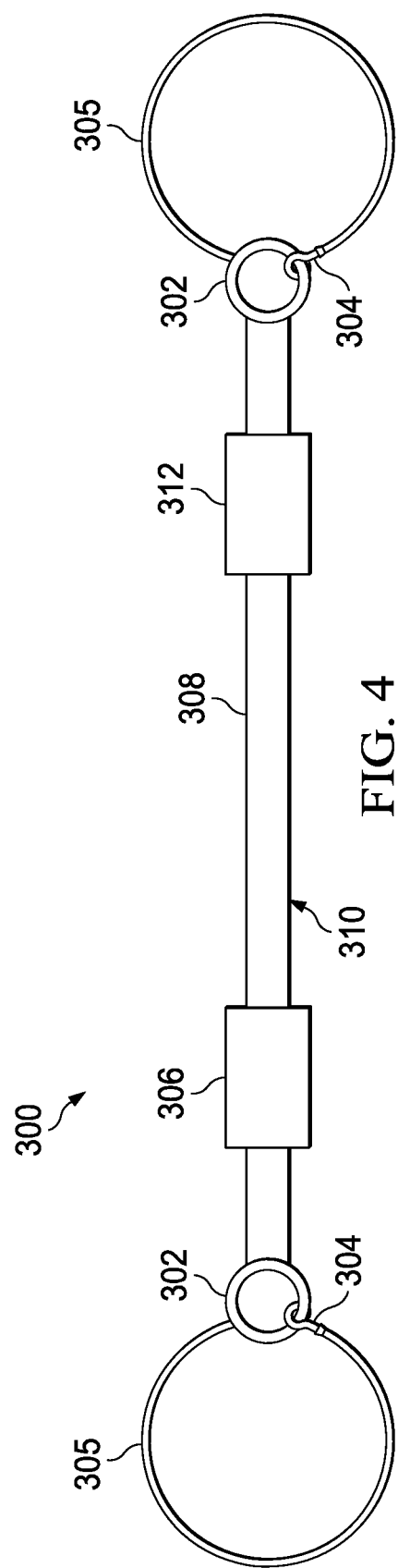

AERIAL MARKSMAN RIG

CROSS-REFERENCE TO RELATED APPLICATION

This application claims priority to U.S. Provisional Patent Application No. 62/421,812 entitled "Aerial Marksman Rig" filed Nov. 14, 2016, which is hereby entirely incorporated herein by reference.

FIELD

This application relates generally to aerial marksman operations.

BACKGROUND

The firearm marksman is an invaluable asset on the battlefield and in many law enforcement situations. Not only does the marksman provide extremely accurate fire on targets, the marksman is also an integral part of the reconnaissance and intelligence gathering efforts for the leadership team. Deploying a marksman in an aircraft can provide many tactical advantages, such as increased mobility and an improved field of vision. As the marksman is reliant on steady aim to be successful, deployment in an aircraft presents some unique challenges for the marksman. The mechanical vibrations and translational forces transmitted through the airframe of an aircraft make unsupported employment of a rifle difficult for the marksman.

The current solution for many marksmen is to rig an improvised rest in the door of an aircraft to provide a steady aiming platform. These field expedient solutions introduce new challenges for the marksman. Should a teammate or member of the aerial vehicle crew need to quickly board or egress the aircraft, that individual would then run the risk of entanglement with the marksman's rig or the marksman must unsecure at least one end of the rig and then quickly reengage the platform to resume operations.

If the marksman is required to improvise with whatever is on hand or to create a custom device, then many operational issues can arise. The lack of a standardized aerial rig for marksman aerial operations may create a situation in which effective training is difficult. Proper maintenance to ensure proper functioning, cross compatibility with different airframes, familiarity from one marksman to the next, and identical operating conditions from one usage to the next are just a small sampling of the issues that non-standardization may cause in the operational environment.

Thus, there exists a need for a device, henceforth referred to as an aerial marksman rig or marksman rig, that allows supported fire in an aircraft in which the supporting platform is standardized and has features that provide for efficacy and efficiency in a multitude of operating conditions and airframes.

BRIEF DESCRIPTION OF THE DRAWINGS

FIGS. 1 and 1A illustrate an embodiment of a double hook aerial marksman rig.

FIG. 3 illustrates an embodiment of a double loop aerial marksman rig without a quick release.

FIG. 4 illustrates an embodiment of a double loop aerial marksman rig with a quick release.

DETAILED DESCRIPTION

Figure 2:
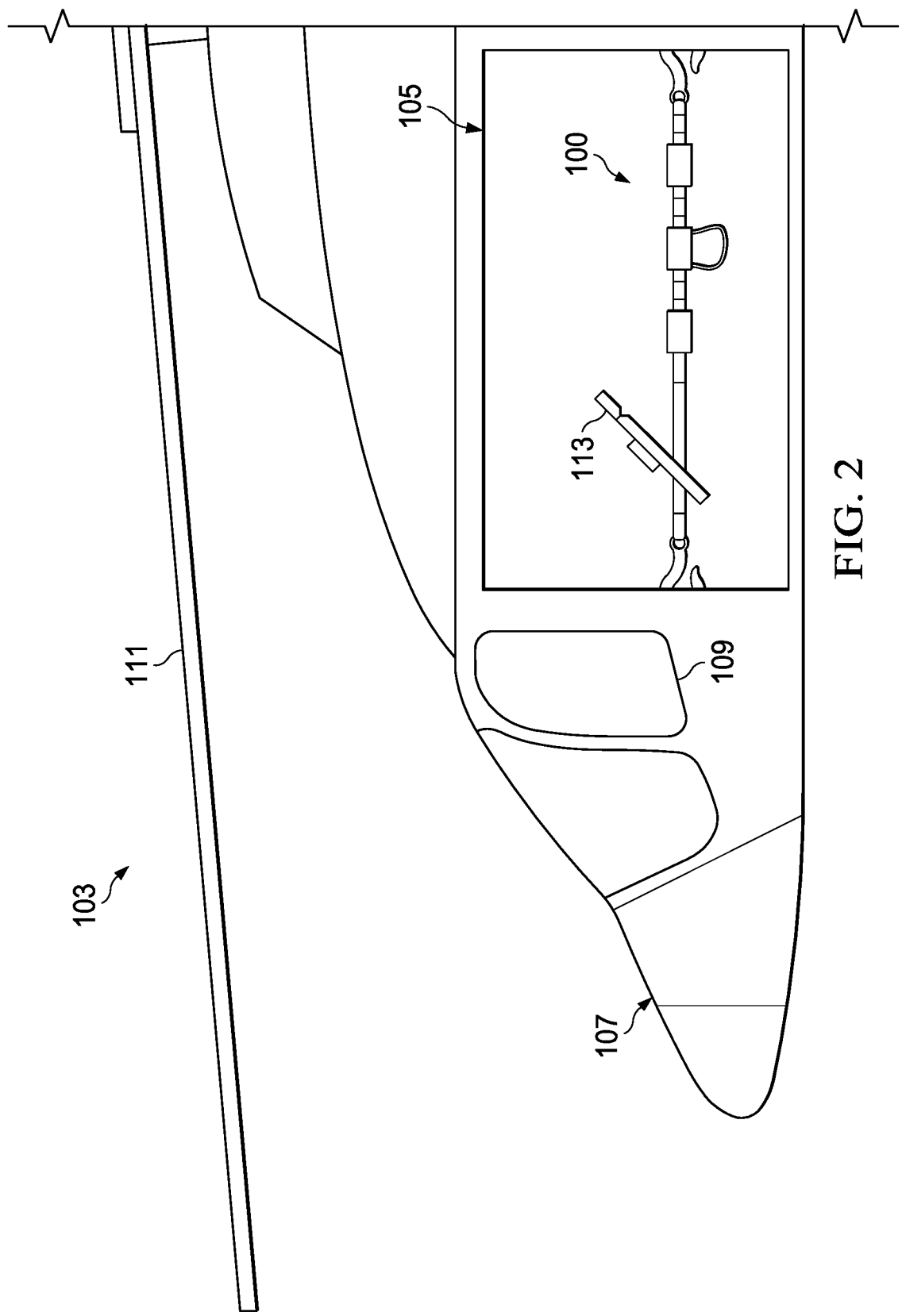
FIG. 2 illustrates the double-hook aerial marksman rig embodiment of FIGS. 1 and 1A deployed in an aircraft.

One embodiment of an aerial marksman rig, as can be seen in FIG. 1, may be configured so as to be compatible with the MH-60 family of helicopters. An end snap hook 102 at each terminal end of the rig 100 may attach to hardpoints already present in the aircraft. Each hardware component of the rig 100 may be connected to the next component through a series of strap sections 106A, 106B, and 114.

The straps sections 106A, 106B, and 114 may be of any material that is suitable for the environs and conditions that law enforcement and military organizations may encounter in operational situations. These materials may be wire rope, aircraft cable, polymer webbing, woven natural fiber, woven polymer, stranded polymer, stranded natural fiber, or other material appropriate for cable or strap construction. The strap geometry may be of a rectangular nature, circular rope-like nature, flat or tubular webbing, or any other cross-sectional geometry appropriate for the construction of a strap.

The straps sections 106A, 106B and 114 may be joined to other rig components, such as ring connectors and hooks, through the formation of a loop in the strap. Such a loop may allow an appropriate portion of other components to pass through said loop and thus mate the component to the strap section. The formation of said loop may be realized through the mechanical binding of a tail end the strap section to a preceding section of said strap section. One such method of mechanical joining may include stitching. This stitching may comprise staggered box stitching. Other modes of mechanically joining the straps to components through loop formation may include, but not be limited to, braiding, splicing, thermal bonding, resins or glues, and other modes common to rope and strap construction. Some models of components may have inherent means for mating a strap to said component and such means may be utilized in those cases.

As seen in FIG. 1A, at areas of the rig 100 in which vulnerable components may be exposed to environmental hazards and wear, said components may be covered in a protective coating or sheath 116. These vulnerable components may include the strap sections 106A, 106B, and 114 while the protective coating 116 may be heat shrink tubing. The protective coating 116 may be applied to all exposed surfaces of a component or only at areas of high risk of damage, such as stitching sites or other mechanically joined sites.

A marksman may rest the weapon on a section of strap 114 that connects the tensioner 104 to an end snap hook 102. This section of strap 114 may serve as the weapon stabilizing platform 115 for the weapon system 113 to be employed. A marksman may also utilize any section 106A, 106B, and 114 of a rig 100 to stabilize a weapon 113 as a situation may dictate.

Such a tensioner 104 may comprise a manual ratchet device but may also be of any of a number of configurations such as cam buckles, a screw take-up device, a vertical gravity take-up device, a horizontal gravity take-up device, threaded eye devices, friction binding devices, elastic strap (such as a rubber strap or a shock or bungee cord), or other suitable device as appropriate for the strap material and geometry employed in the rig. The tensioner device 104 may also serve to allow adjustment for personal preferences in the weapon support platform 115 of the rig. Whereas some marksmen may prefer a tight and rigid platform 115, others may prefer to utilize a platform 115 with greater slack. The tensioning device 104 may exist as a single component or as multiple devices in the rig.

The tensioner 104 may be disposed at the point between strap section 114 and strap section 106A. A buckle 108 may serve as a detensioning device in the rig 100. Said buckle 108 may form a section of excess or slack strap 110 when said buckle is engaged. Said slack strap 110 may be utilized in detensioning operations of the rig 100 through the release of said buckle. Such a buckle 108 may be of use in situations wherein the tensioner 104 is bound tightly enough to make release of the tensioner 104 difficult. Release of the buckle 108 may release enough tension in the system so as to allow the tensioner to then be disengaged and any remaining tension to be released as desired. In some embodiments, the buckle 108 may be a COBRA style buckle.

A quick release device 112, such as a snap shackle, may be disposed between the buckle 108 and an end snap hook 102. The quick release device 112 may allow the marksman to immediately accommodate access to the aircraft opening in which the rig may be employed. Such a quick release device 112 may be of benefit in situations wherein immediate disengagement of the rig 100 is crucial. Such situations may include, but not be limited to, emergency evacuation of the aircraft, deployment of passengers into combat, and access to injured occupants of the aircraft. Such a quick release device 112 may also allow an aircraft to maintain a partially assembled rig in the aircraft. The ability to maintain a partially assembled rig may be of benefit for an aircraft that is required to maintain a heightened alert status, such as in a military quick reaction force, so as to reduce preparation time prior to aircraft mission deployment.

Alternately, the quick release device 112 may be a slide release buckle, side release buckle, center release buckle, fast hook device, or other quick release mechanism commonly found in the fields of aircraft rigging, sailing, mountain climbing or other related fields.

Of course, the tensioner 104, buckle 108, quick release device 112, and any other components may be disposed between the end snap hooks 102 in any suitable sequence along the length of the rig 100 and may be used singly, in multiples of any or all said components, or any combination thereof.

Alternately, the rig 100 may be comprised of the tensioner 104, end snap hooks 102, and strap section 106A and 114 without the inclusion of one or more of the buckle 108, quick release 112 and strap sections 106B.

The deployment of a rig 100 in an aircraft 103 may be seen in FIG. 2. A rig 100 may be installed in a cargo door opening 105. Said cargo door opening 105 may be located in the fuselage 107 to the rear of cockpit doors 109. The fuselage may be located beneath the rotor system 111. Therein may also be seen a weapon 113 utilizing a rig 100.

Figure 5:
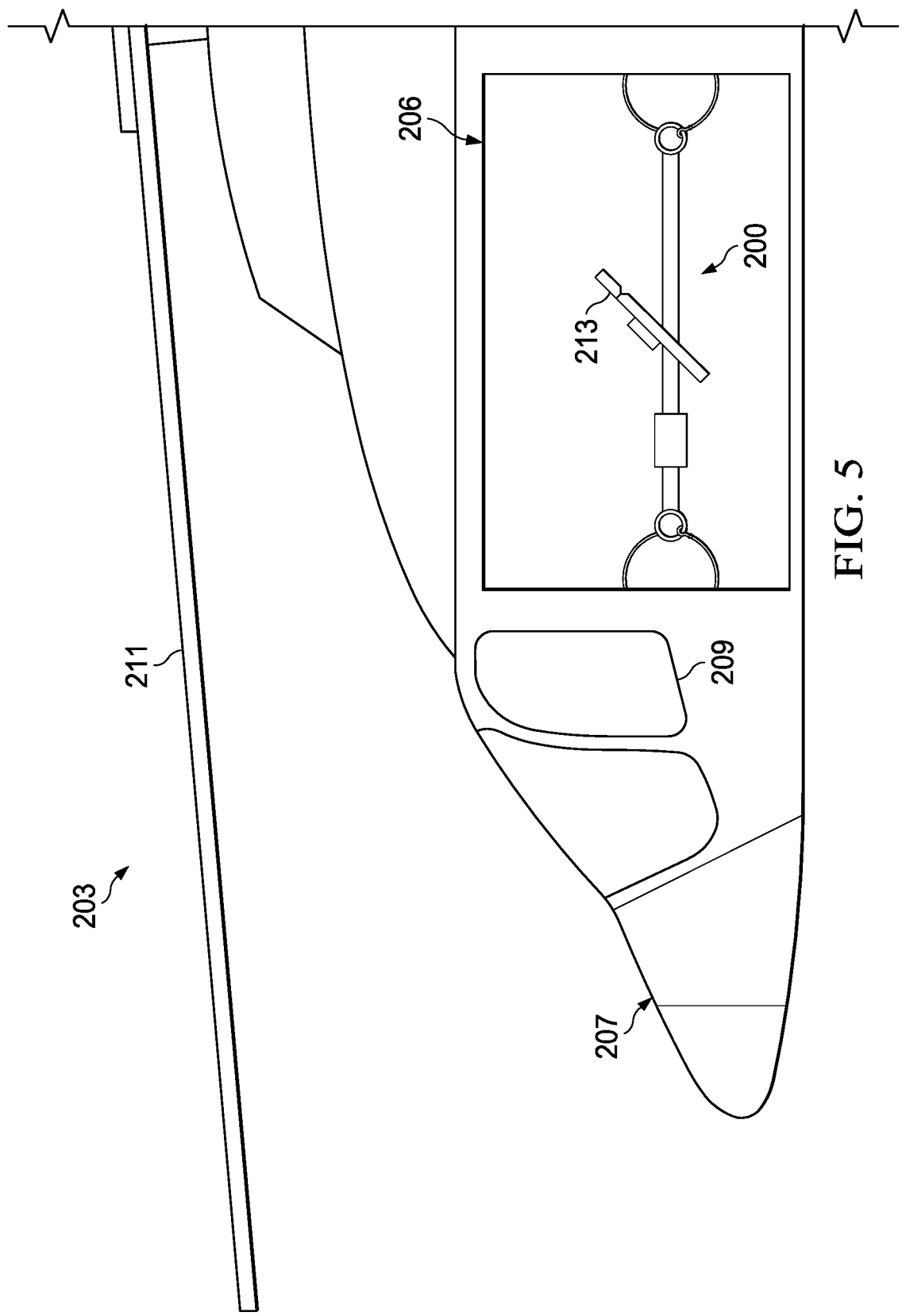
FIG. 5 illustrates an embodiment of a double loop aerial marksman rig deployed in an aircraft.

An embodiment of a rig 200, as can be seen in FIG. 3, may be configured to be deployable in the MH-60 helicopters as configured for use in the U.S. Navy. The deployment of a rig 200 in an aircraft 203 may be seen in FIG. 5. A rig 200 may be installed in a cargo door opening 206. A cargo door may be located in the fuselage 207 to the rear of cockpit doors 209. The fuselage may be located beneath the rotor system 211. Therein may also be seen a weapon 213 utilizing a rig 200.

The rig 200 may utilize a double loop configuration. The rig 200 may couple to the aircraft 203 by wrapping loops 205 around components of the aircraft 203 and locking back onto the ring connector 202 through use of a hook 204. The hardware components of the rig 200 may be connected through various lengths of strap loops 205. The section of strap 217 between the tensioner 215 and farthest ring connector 202 may serve as the stabilizing platform 219 for the marksman's weapon.

An embodiment of a rig 200, as can be seen in FIG. 3, may be configured to be deployable in the MH-60 helicopters as configured for use in the U.S. Navy. The deployment of a rig 200 in an aircraft 203 may be seen in FIG. 5. A rig 200 may be installed in a cargo door opening 206. A cargo door may be located in the fuselage 207 to the rear of cockpit doors 209. The fuselage may be located beneath the rotor system 211. Therein may also be seen a weapon 213 utilizing a rig 200.

As illustrated in FIG. 4, another embodiment may also utilize a double loop configuration with the addition of a quick disconnect device. The rig 300 may couple to the aircraft by wrapping loops 305 around components of the aircraft 303 and locking back onto the ring connector 302 through use of a hook 304. The hardware components of the rig 300 may be connected through various lengths of strap loops 305. The section of strap 308 between the tensioner 306 and a quick disconnect device 312 may serve as the stabilizing platform 310 for the marksman's weapon. Said quick disconnect device 312 may be disposed between the strap section 308 and a ring connector 302. A marksman may also utilize any section of a rig 300 to stabilize a weapon as a situation may dictate.

Figure 6A:
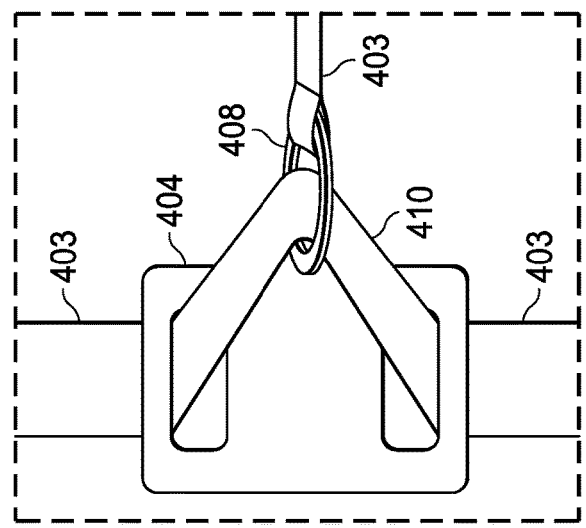
FIGS. 6 and 6A illustrate an embodiment of a H-shaped aerial marksman rig.
Figure 6:
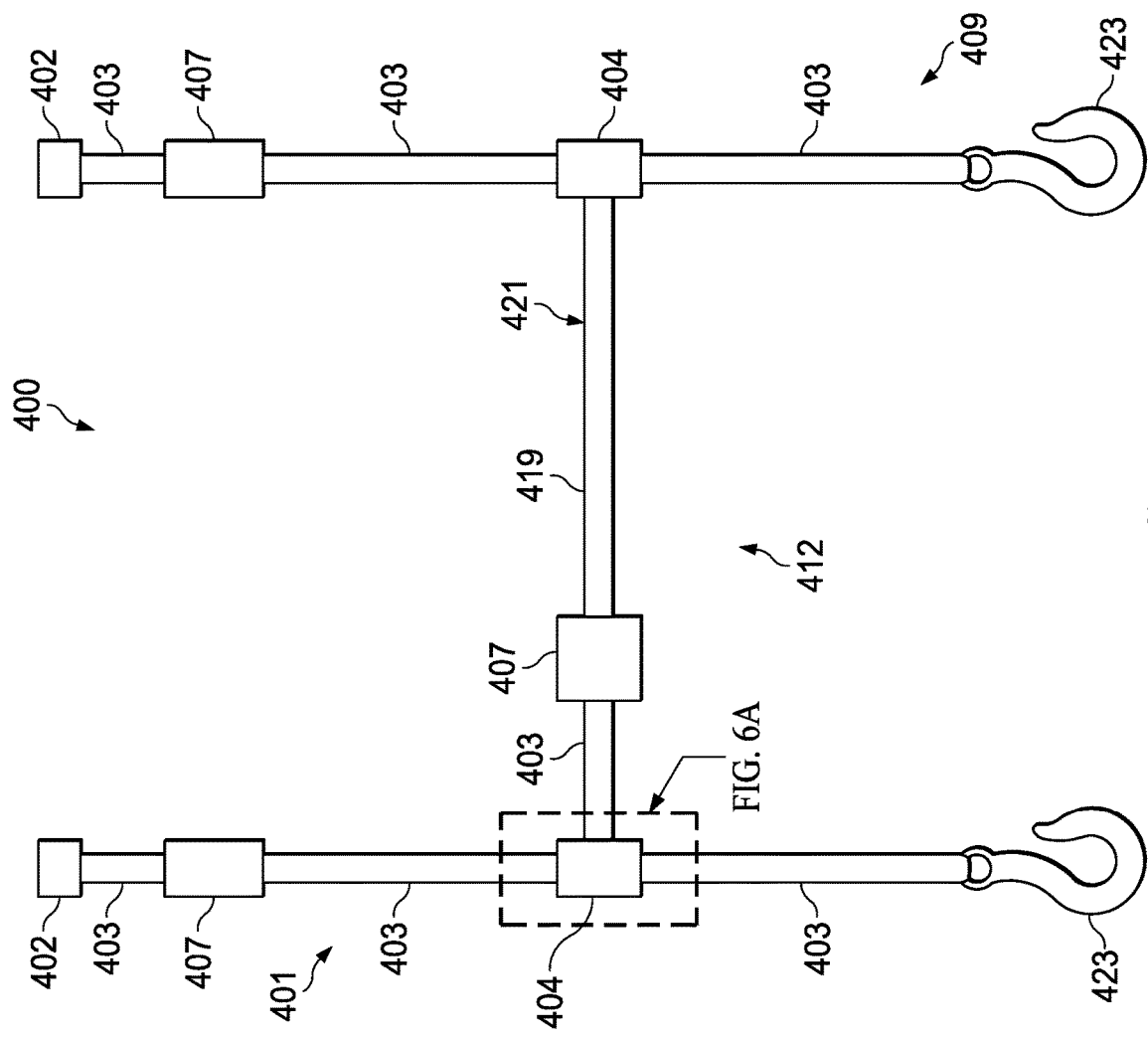

An embodiment of a rig, as seen in FIG. 6, may be configured for deployment in a member of the UH-1 family of helicopters. The rig 400 may utilize a general H-shaped configuration. The rig 400 may be comprised of three main elements, namely a first vertical upright leg 401, a second vertical upright leg 409, and a horizontal cross leg 412 to form an H-shaped rig 400. Of course, such upright legs 401 and 409 do not have to be oriented truly vertically, but may be generally upright in relation to the airframe. Legs 401 and 409 in the vertical plane may be normal to the fuselage or may lie at any incident angle so as to allow attachment to the airframe. Legs 401 and 409, which may be positioned at opposing sides of the aircraft door opening 405, may connect to the points in floor and ceiling of the aircraft 403 or at other attachment points at or near the floor and ceiling of the aircraft. Similarly, the horizontal cross leg 412 does not have to be oriented truly horizontally, but may be disposed between the upright legs 401, 409 at any angle desired by the marksman.

The individual hardware components of the rig 400 may be connected to one another through various lengths of strap 403 disposed between said components. A rig 400 may employ on a plurality of tensioners 407 to facilitate mounting in this configuration. Each leg 401 and 409 in the vertical plane may comprise of a tensioner 407, an end snap hook 423, a friction buckle 404, and a 12-jaw fitting connector 402 joined into a unit by sections of strap 403 between the said components 407, 423, and 402. In some embodiments, the 12-jaw fitting may comprise a round ring or D-ring connector so as to mate to the strap.

The tensioner 407 of each leg 401 and 409 may be disposed toward the "top" end of the legs 401 and 409 toward the 12-jaw connector 402 so as to provide ready access to the tensioner 407 once the rig 400 has been mated to the aircraft connection points. Although, the "top" end disposition of the tensioner 407 may represent an advantageous disposition in the upright legs 401 and 409, said tensioner 407 may be disposed anywhere along the length of said upright legs 401 and 409. It is also to be noted that the tensioner 407 of leg 401 and the tensioner 407 of leg 409 do not have to be in corresponding locations to one another. For example, the tensioner 407 of leg 401 may located toward the "top" of said leg while the tensioner 407 of leg 409 may be located toward the "bottom" of said leg. The 12-jaw connector 402 and hook 423 may be replaced by any style of connector so as to adapt a rig 400 to the available connection points in a particular airframe.

In some embodiments, upright legs 401 and 409 may support a cross leg 412 where in which the cross leg 412 lies in or near to in the horizontal plane. Said cross leg 412 may be comprised of a tensioner 407, strap sections 403 and 419, and ring connectors 408 wherein said ring connectors 408 are disposed at the outer terminus of strap section 403 and 419. Strap section 419 may serve as a weapon stabilization platform 421. A marksman, or more than one marksman, may also utilize any section of a rig 400 to stabilize a weapon as a situation may dictate.

A ring connector may be any closed loop connector wherein there is an orifice created by the body of the connector. The ring connector may be of any geometry, such as a circular body, D-ring configuration, triangular, rectangular, square, or other body shape that may allow for the connection of a strap or plurality of straps to the connector. Such a ring connector may be formed of a metal, polymer, or other suitable material as commonly found in the art.

As can be seen in FIG. 6A, a friction buckle 404 in the upright legs 401 and 409 may serve as a positioning device for a cross leg 412. Of course, such a cross leg 412 does not have to be oriented in the true horizontal and may be disposed at any suitable angle incident to the uprights legs 401 and 409. The friction buckle 404 may allow the cross leg 412 to be set at any desired height along the upright legs 401 and 409 by sliding said friction buckles 404 to the desired height. Such height adjustment of the cross leg 412 may aid to provide weapon support in different firing positions such the prone, sitting, kneeling, and standing positions. The friction buckle 404 of the upright legs 401 and 409 may not be required to be set at the same height as the buckle 404 of the opposing upright leg 401 or 409 so as to accommodate differing firing positions without requiring readjustment of the cross leg 412. Weapon stability may be still achieved though application of pressure of the weapon into the weapon support platform 421.

In continuing reference to FIG. 6A, a ring connector 408 disposed at each terminus of the cross leg 412 may loop through a portion of slack strap 410 of upright legs 401 and 409. Said slack strap 410 may be created by pulling a loop into the leg 401 and 409 as said leg passes through the friction buckle 404. When the slack strap 410 is drawn tight, said friction buckle 404 may serve to lock the vertical position of the cross leg 412 in relation to the upright legs 401 and 409. By repositioning one or both friction buckles 404, the cross leg 412 may then be adjusted for height or angle of incidence with the upright legs 401 and 409. A cross leg 412 may thus lie normal to any upright legs 401 and 409 or at any angle incident to an upright leg 401 and 409 as preferred by the individual preference of a particular marksman or by other mission factors that may influence rig configuration.

Figure 7:
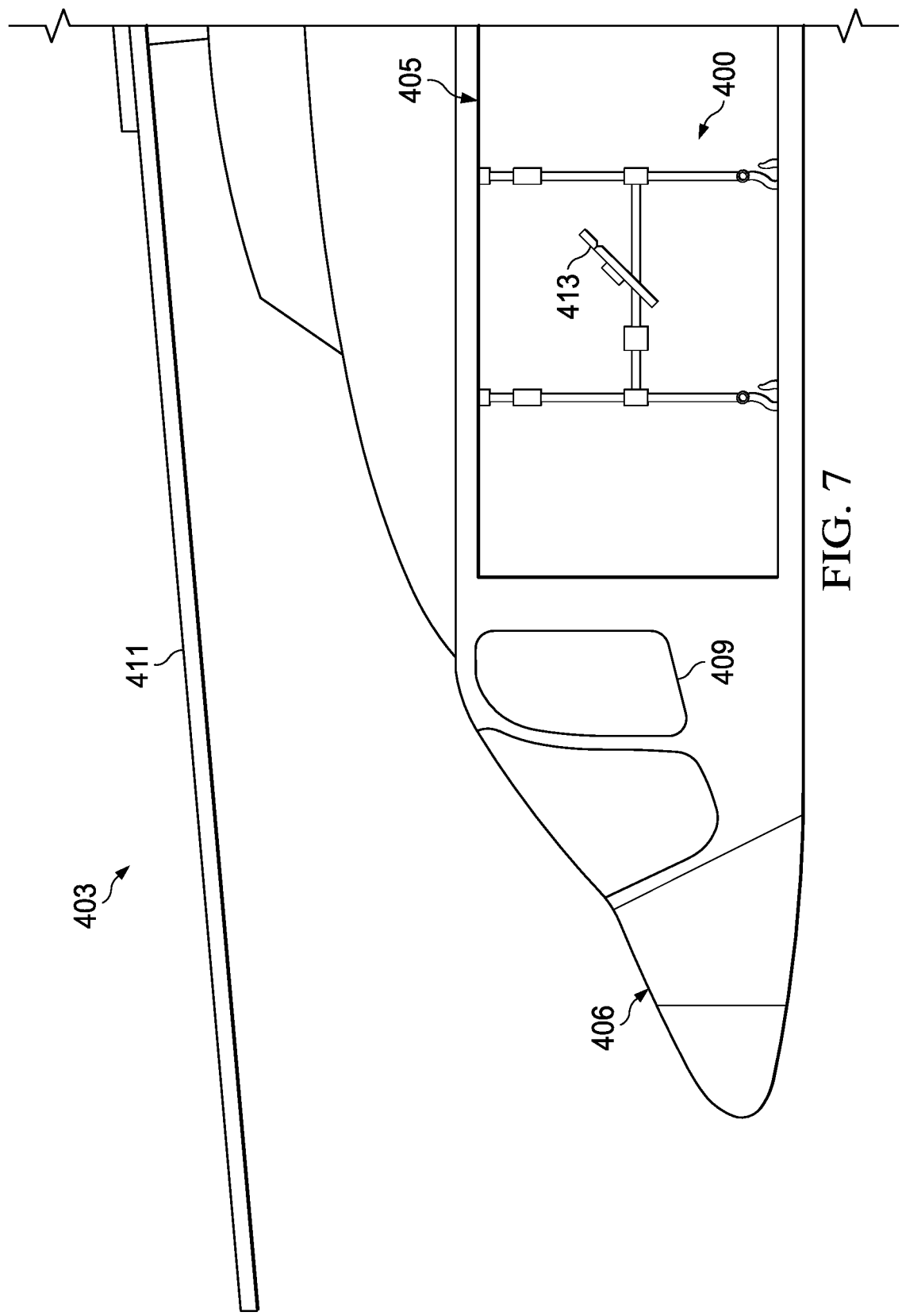
FIG. 7 illustrates an H-shaped aerial marksman rig deployed in an aircraft.

The deployment of a such a rig 400 in an aircraft 403 can be seen in FIG. 7. A rig 400 may be installed in a cargo door opening 405, but may also be installed in openings formed by ramps, crew doors, or any other such opening. On the aircraft 403, a cargo door opening 405 may be located in the fuselage 406 to the rear of cockpit doors 409. The fuselage 406 may be located beneath the rotor system 411. Therein may also be seen a weapon 413 utilizing a rig 400.

Figure 8:
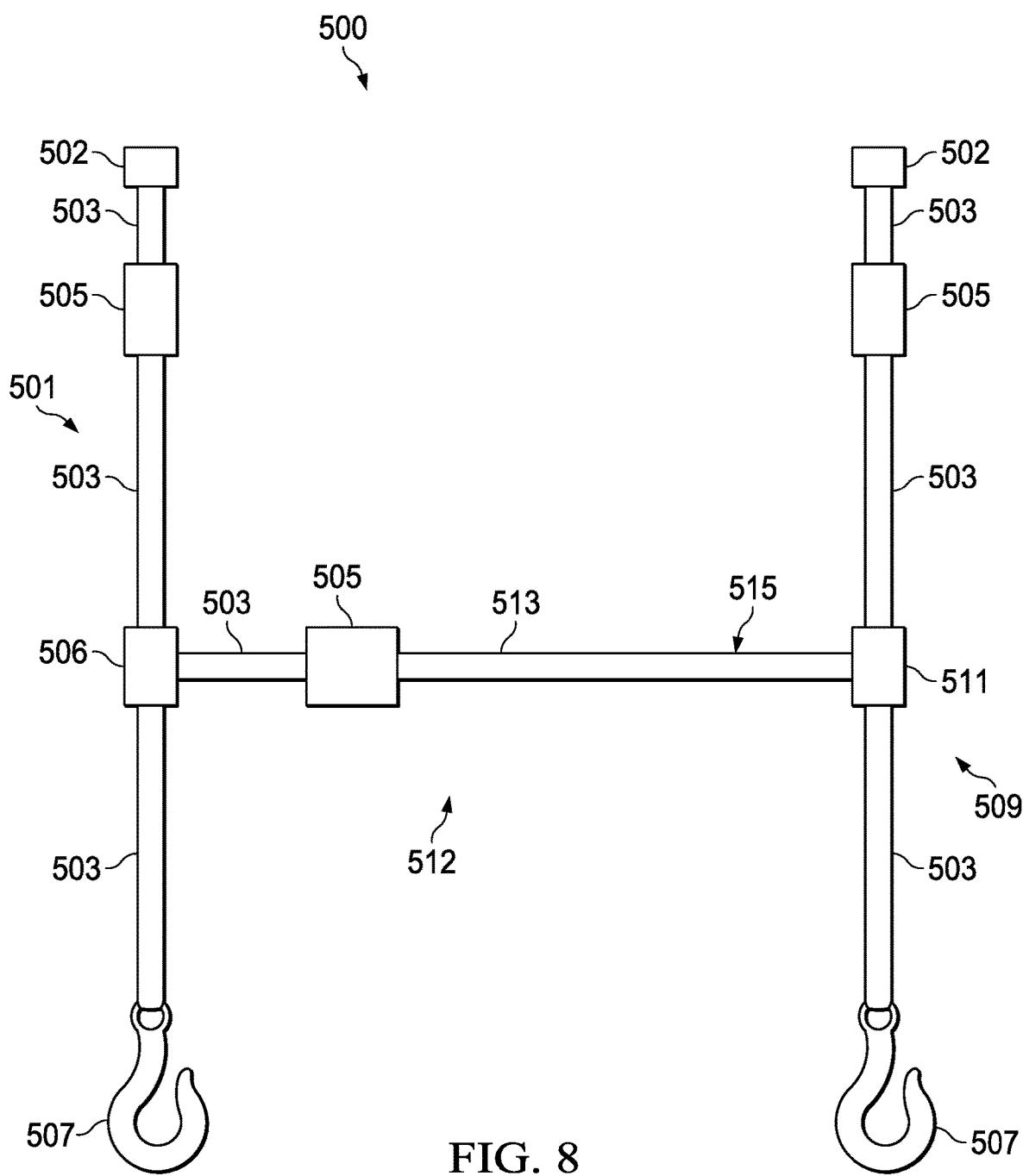
FIG. 8 illustrates an embodiment of a H-style aerial marksman rig with a quick release and a single friction buckle.

As illustrated in FIG. 8, another embodiment may utilize a general H-shaped configuration with the addition of other components. The rig 500 may be comprised of three main elements, namely a first vertical upright leg 501, a second vertical upright leg 509, and a horizontal cross leg 512 to form a generally H-shaped rig 500. Of course, such upright legs 501 and 509 do not have to be oriented truly vertically, but may be generally upright in relation to the airframe. Legs 501 and 509 in the vertical plane may be normal to the fuselage or may lie at any incident angle so as to allow attachment to the airframe. Legs 501 and 509, which may be positioned at opposing sides of the aircraft door opening, may connect to the points in floor and ceiling of the aircraft or at other attachment points at or near the floor and ceiling of the aircraft. Similarly, the horizontal cross leg 512 does not have to be oriented truly horizontally, but may be disposed between the upright legs 501, 509 at any angle desired by the marksman.

The individual hardware components of the rig 500 may be connected to one another through various lengths of strap 503 disposed between said components. A rig 500 may employ on a plurality of tensioners 505 to facilitate mounting in this configuration. Each leg 501 and 509 in the vertical plane may comprise of a tensioner 505, an end snap hook 507, a friction buckle 506, and a 12-jaw fitting connector 502 joined into a unit by sections of strap 503 between the said components 505, 507, and 502. In some embodiments, the 12-jaw fitting may include a round ring or D-ring connector so as to mate to the strap.

The tensioner 505 of each leg 501 and 509 may be disposed toward the "top" end of the legs 501 and 509 toward the 12-jaw connector 502 so as to provide ready access to the tensioner 505 once the rig 500 has been mated to the aircraft connection points. Although, the "top" end disposition of the tensioner 505 may represent an advantageous disposition in the upright legs 501 and 509, said tensioner 505 may be disposed anywhere along the length of said upright legs 501 and 509. It is also to be noted that the tensioner 505 of leg 501 and the tensioner 505 of leg 509 do not have to be in corresponding locations to one another. For example, the tensioner 505 of leg 501 may located toward the "top" of said leg while the tensioner 505 of leg 509 may be located toward the "bottom" of said leg. The 12-jaw connector 502 and hook 507 may be replaced by any style of connector so as to adapt a rig 500 to the available connection points in a particular airframe.

In some embodiments, upright legs 501 and 509 may support a cross leg 512 where in which the cross leg 512 lies in or near to in the horizontal plane. Said cross leg 512 may be comprised of a tensioner 505, strap sections 503 and 513, and ring connectors (not shown) wherein said ring connectors are disposed at the outer terminus of strap section 503 and 513. Strap section 513 may serve as a weapon stabilization platform 515. A marksman, or more than one marksman, may also utilize any section of a rig 500 to stabilize a weapon as a situation may dictate.

A ring connector may be any closed loop connector wherein there is an orifice created by the body of the connector. The ring connector may be of any geometry, such as a circular body, D-ring configuration, triangular, rectangular, square, or other body shape that may allow for the connection of a strap or plurality of straps to the connector. Such a ring connector may be formed of a metal, polymer, or other suitable material as commonly found in the art.

The friction buckle 506 in the upright legs 501 and 509 may serve as a positioning device for a cross leg 512. Of course, such a cross leg 512 does not have to be oriented in the true horizontal and may be disposed at any suitable angle incident to the uprights legs 501 and 509. The friction buckle 506 may allow the cross leg 512 to be set at any desired height along the upright legs 501 and 509 by sliding said friction buckles 506 to the desired height. Such height adjustment of the cross leg 512 may aid to provide weapon support in different firing positions such the prone, sitting, kneeling, and standing positions. The friction buckle 506 of the upright legs 501 and 509 may not be required to be set at the same height as the buckle 506 of the opposing upright leg 501 or 509 so as to accommodate differing firing positions without requiring readjustment of the cross leg 512. Weapon stability may be still achieved though application of pressure of the weapon into the weapon support platform 515.

The ring connector disposed at each terminus of the cross leg 512 may loop through a portion of slack strap of upright legs 501 and 509. Said slack strap may be created by pulling a loop into the leg 501 and 509 as said leg passes through the friction buckle 506. When the slack strap is drawn tight, said friction buckle 506 may serve to lock the vertical position of the cross leg 512 in relation to the upright legs 501 and 509. By repositioning one or both friction buckles 506, the cross leg 512 may then be adjusted for height or angle of incidence with the upright legs 501 and 509. A cross leg 512 may thus lie normal to any upright legs 501 and 509 or at any angle incident to an upright leg 501 and 509 as preferred by the individual preference of a particular marksman or by other mission factors that may influence rig configuration.

A rig 500 may be installed in a cargo door opening of an aircraft, but may also be installed in openings formed by ramps, crew doors, or any other such opening. On the aircraft, a cargo door opening may be located in the fuselage to the rear of cockpit doors. The fuselage may be located beneath the rotor system.

Further referring to FIG. 8, a rig 500 may have a quick release device 511, disposed at the terminus of strap section 513 with the opposing end of the quick release 511 maintaining a ring connector, such as ring connector previously described, for joining the associated end of the cross leg 512 to the associated upright leg 501 or 509.

As in the previous embodiments, a quick release device 511 may allow the marksman to accommodate access to the aircraft opening in which the rig 500 may be employed. A section of strap 513 may serve as the weapon stabilizing platform 515. Said strap section 513 may be disposed between the quick release device 511 and the tensioner 505. A marksman may also utilize any section of a rig 500 to stabilize a weapon as a situation may dictate.

Figure 9:
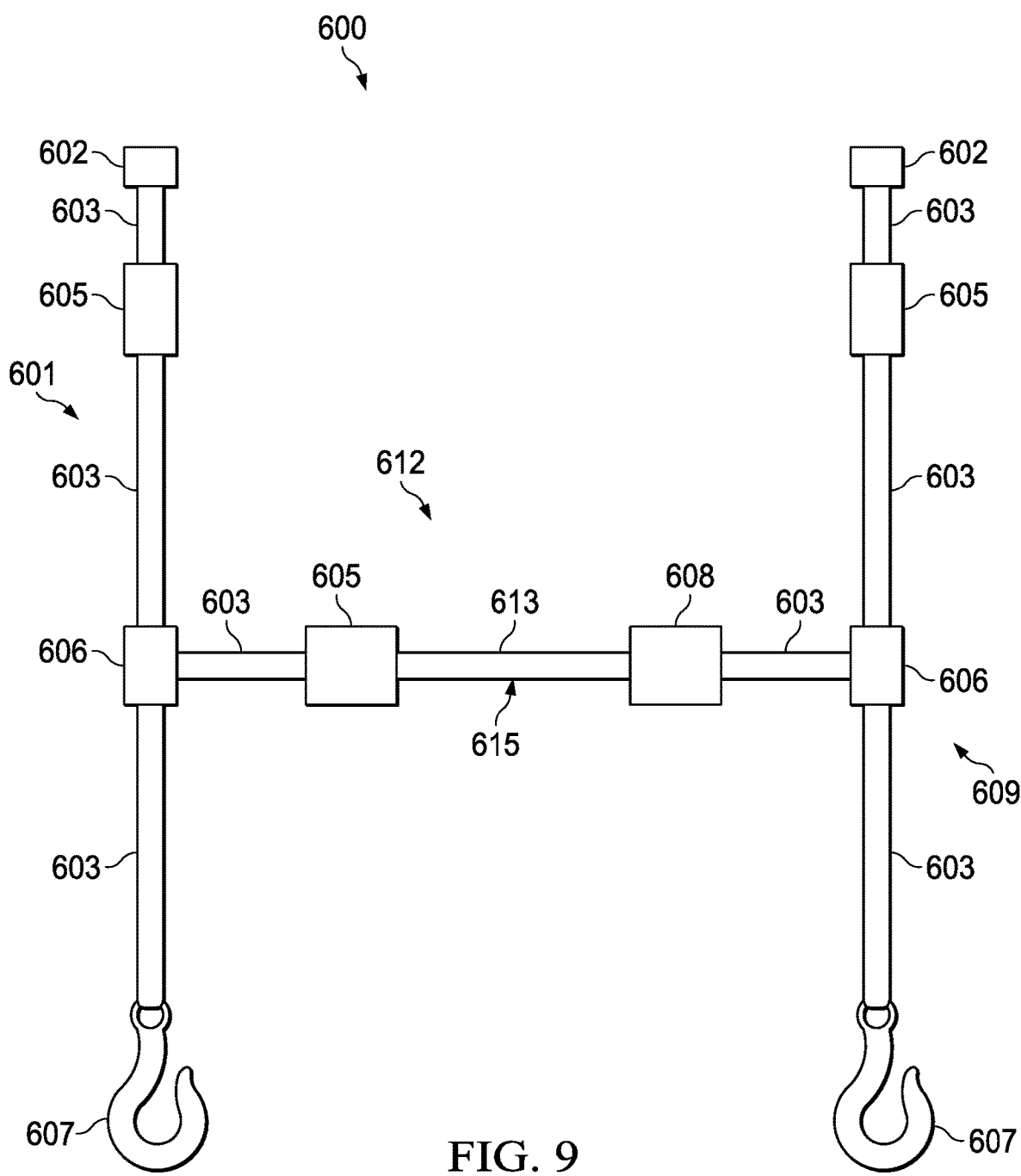
FIG. 9 illustrates an embodiment of a H-style aerial marksman rig with a quick release and multiple friction buckles.

As can be seen in FIG. 9, yet another embodiment may also utilize a general H-shaped configuration with further modifications as compared to previous embodiments, namely an in-line quick release device. The rig 600 may be comprised of three main elements, namely a first vertical upright leg 601, a second vertical upright leg 609, and a horizontal cross leg 612 to form an H-shaped rig 600. Of course, such upright legs 601 and 609 do not have to be oriented truly vertically, but may be generally upright in relation to the airframe. Legs 601 and 609 in the vertical plane may be normal to the fuselage or may lie at any incident angle so as to allow attachment to the airframe. Legs 601 and 609, which may be positioned at opposing sides of the aircraft door opening 405, may connect to the points in floor and ceiling of the aircraft 603 or at other attachment points at or near the floor and ceiling of the aircraft. Similarly, the horizontal cross leg 612 does not have to be oriented truly horizontally, but may be disposed between the upright legs 601, 609 at any angle desired by the marksman.

The individual hardware components of the rig 600 may be connected to one another through various lengths of strap 603 disposed between said components. A rig 600 may employ on a plurality of tensioners 605 to facilitate mounting in this configuration. Each leg 601 and 609 in the vertical plane may comprise of a tensioner 605, an end snap hook 607, a friction buckle 606, and a 12-jaw fitting connector 602 joined into a unit by sections of strap 603 between the said components 605, 607, and 602. In some embodiments, the 12-jaw fitting may comprise a round ring or D-ring connector so as to mate to the strap.

The tensioner 605 of each leg 601 and 609 may be disposed toward the "top" end of the legs 601 and 609 toward the 12-jaw connector 602 so as to provide ready access to the tensioner 605 once the rig 600 has been mated to the aircraft connection points. Although, the "top" end disposition of the tensioner 605 may represent an advantageous disposition in the upright legs 601 and 609, said tensioner 605 may be disposed anywhere along the length of said upright legs 601 and 609. It is also to be noted that the tensioner 605 of leg 601 and the tensioner 605 of leg 609 do not have to be in corresponding locations to one another. For example, the tensioner 605 of leg 601 may located toward the "top" of said leg while the tensioner 605 of leg 609 may be located toward the "bottom" of said leg. The 12-jaw connector 602 and hook 607 may be replaced by any style of connector so as to adapt a rig 600 to the available connection points in a particular airframe.

In some embodiments, upright legs 601 and 609 may support a cross leg 612 in which the cross leg 612 lies in or near to in the horizontal plane. Said cross leg 612 may be comprised of a tensioner 605, strap sections 603 and 613, and ring connectors (not shown) wherein said ring connectors are disposed at the outer terminus of strap section 603 and 613. Strap section 613 may serve as a weapon stabilization platform 615. A marksman, or more than one marksman, may also utilize any section of a rig 600 to stabilize a weapon as a situation may dictate.

A ring connector may be any closed loop connector wherein there is an orifice created by the body of the connector. The ring connector may be of any geometry, such as a circular body, D-ring configuration, triangular, rectangular, square, or other body shape that may allow for the connection of a strap or plurality of straps to the connector. Such a ring connector may be formed of a metal, polymer, or other suitable material as commonly found in the art.

The friction buckle 606 in the upright legs 601 and 609 may serve as a positioning device for a cross leg 612. Of course, such a cross leg 612 does not have to be oriented in the true horizontal and may be disposed at any suitable angle incident to the uprights legs 601 and 609. The friction buckle 606 may allow the cross leg 612 to be set at any desired height along the upright legs 601 and 609 by sliding said friction buckles 606 to the desired height. Such height adjustment of the cross leg 612 may aid to provide weapon support in different firing positions such the prone, sitting, kneeling, and standing positions. The friction buckle 606 of the upright legs 601 and 609 may not be required to be set at the same height as the buckle 606 of the opposing upright leg 601 or 609 so as to accommodate differing firing positions without requiring readjustment of the cross leg 612. Weapon stability may be still achieved though application of pressure of the weapon into the weapon support platform 615.

Additionally, a ring connector (not shown) disposed at each terminus of the cross leg 612 may loop through a portion of a section of slack strap of upright legs 601 and 609. Said slack strap may be created by pulling a loop into the leg 601 and 609 as said leg passes through the friction buckle 606. When the slack strap is drawn tight, said friction buckle 606 may serve to lock the vertical position of the cross leg 612 in relation to the upright legs 601 and 609. By repositioning one or both friction buckles 606, the cross leg 612 may then be adjusted for height or angle of incidence with the upright legs 601 and 609. A cross leg 612 may thus lie normal to any upright legs 601 and 609 or at any angle incident to an upright leg 601 and 609 as preferred by the individual preference of a particular marksman or by other mission factors that may influence rig configuration.

A rig 600 may be installed in a cargo door opening of an aircraft, but may also be installed in openings formed by ramps, crew doors, or any other such opening. On the aircraft, a cargo door opening may be located in the fuselage to the rear of cockpit doors. The fuselage may be located beneath the rotor system.

As can also be seen in FIG. 9, there may be a quick release device 608 in the rig 600 wherein said quick release is disposed in-line of the cross leg 612. A Wichard swivel eye HR snap shackle is one example of such a quick release device 608. Said quick release device 608 may be disposed such that strap section 613 terminates at the quick release 608 and a further section of strap 603 is disposed between the quick release 608 and the upright leg 609. Strap section 603 may then maintain a ring connector, the same such as the ring connector 408, with said ring connector functioning in the manner as disclosed in prior embodiments.

Figure 10:
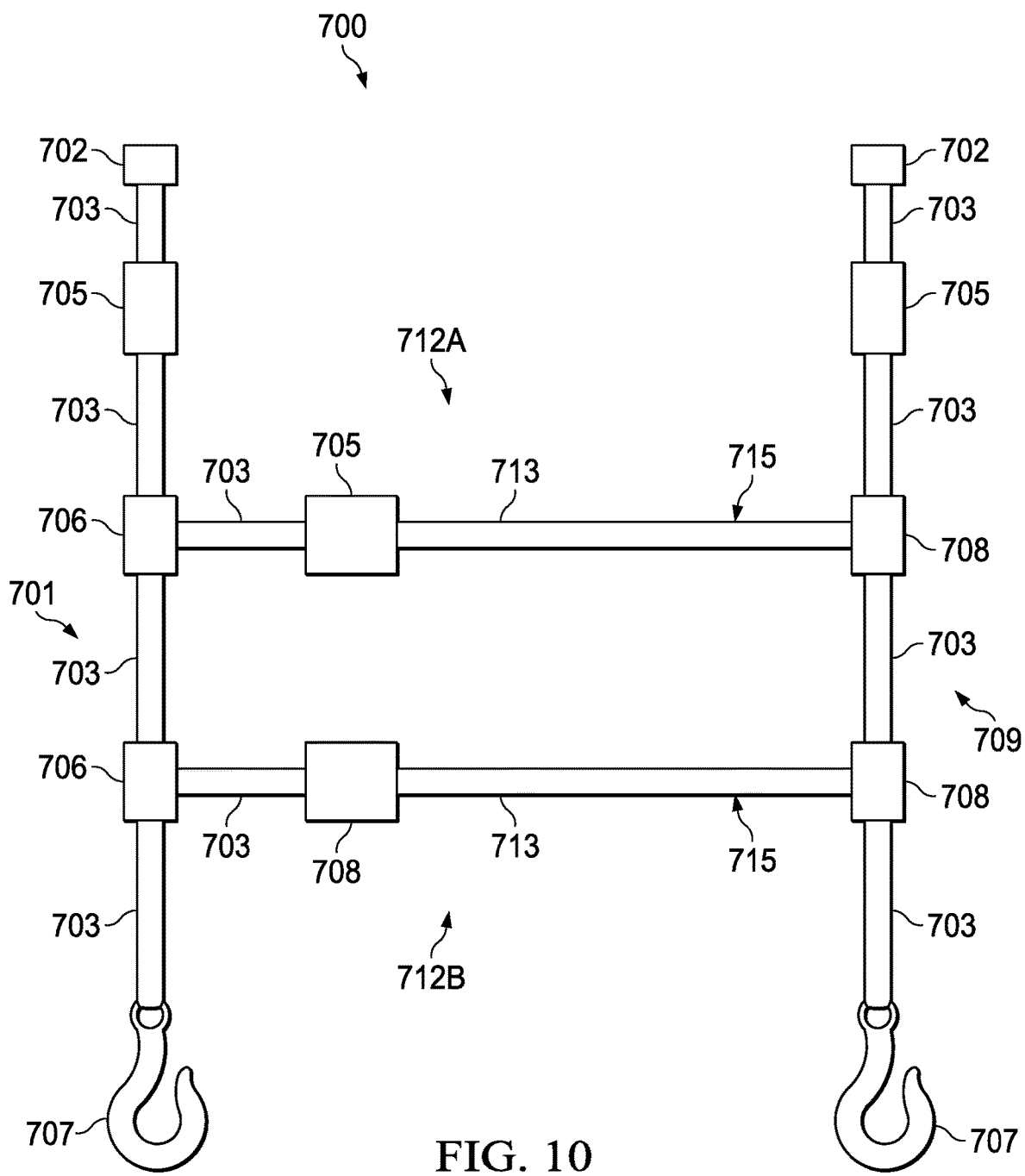
FIG. 10 illustrates an embodiment of a H-style aerial marksman rig with multiple cross legs.

In yet another embodiment, as can be seen in FIG. 10, a rig 700 of a general H-shape configuration with even further modification as compared to prior embodiments, namely concerning the cross leg member.

The rig 700 may be comprised of three main elements, namely a first vertical upright leg 701, a second vertical upright leg 709, and a horizontal cross leg 712A and 712B to form an H-shaped rig 700. Of course, such upright legs 701 and 709 do not have to be oriented truly vertically, but may be generally upright in relation to the airframe. Legs 701 and 709 in the vertical plane may be normal to the fuselage or may lie at any incident angle so as to allow attachment to the airframe. Legs 701 and 709, which may be positioned at opposing sides of the aircraft door opening 405, may connect to the points in floor and ceiling of the aircraft 703 or at other attachment points at or near the floor and ceiling of the aircraft. Similarly, the horizontal cross leg 712A and 712B does not have to be oriented truly horizontally, but may be disposed between the upright legs 701, 709 at any angle desired by the marksman.

The individual hardware components of the rig 700 may be connected to one another through various lengths of strap 703 disposed between said components. A rig 700 may employ on a plurality of tensioners 705 to facilitate mounting in this configuration. Each leg 701 and 709 in the vertical plane may comprise of a tensioner 705, an end snap hook 707, a friction buckle 706, and a 12-jaw fitting connector 702 joined into a unit by sections of strap 703 between the said components 705, 707, and 702. In some embodiments, the 12-jaw fitting may comprise a round ring or D-ring connector so as to mate to the strap.

The tensioner 705 of each leg 701 and 709 may be disposed toward the "top" end of the legs 701 and 709 toward the 12-jaw connector 702 so as to provide ready access to the tensioner 705 once the rig 700 has been mated to the aircraft connection points. Although, the "top" end disposition of the tensioner 705 may represent an advantageous disposition in the upright legs 701 and 709, said tensioner 705 may be disposed anywhere along the length of said upright legs 701 and 709. It is also to be noted that the tensioner 705 of leg 701 and the tensioner 705 of leg 709 do not have to be in corresponding locations to one another. For example, the tensioner 705 of leg 701 may located toward the "top" of said leg while the tensioner 705 of leg 709 may be located toward the "bottom" of said leg. The 12-jaw connector 702 and hook 707 may be replaced by any style of connector so as to adapt a rig 700 to the available connection points in a particular airframe.

In some embodiments, upright legs 701 and 709 may support a plurality of cross leg members 712A and 712B where in which the cross legs 712A and 712B lie in or near to in the horizontal plane. Said cross legs 712A and 712B may be comprised of a tensioner 705 or 708, strap sections 703 and 713, and ring connectors (not shown) wherein said ring connectors are disposed at the outer terminus of strap section 703 and 713. Strap section 713 may serve as a weapon stabilization platform 715. A marksman, or more than one marksman, may also utilize any section of a rig 700 to stabilize a weapon as a situation may dictate.

A ring connector may be any closed loop connector wherein there is an orifice created by the body of the connector. The ring connector may be of any geometry, such as a circular body, D-ring configuration, triangular, rectangular, square, or other body shape that may allow for the connection of a strap or plurality of straps to the connector. Such a ring connector may be formed of a metal, polymer, or other suitable material as commonly found in the art.

The friction buckle 706 in the upright legs 701 and 709 may serve as a positioning device for cross legs 712A and 712B. Of course, such a cross leg 712A or 712B does not have to be oriented in the true horizontal and may be disposed at any suitable angle incident to the uprights legs 701 and 709. The friction buckle 706 may allow the cross legs 712A and 712B to be set at any desired height along the upright legs 701 and 709 by sliding said friction buckles 706 to the desired height. Such height adjustment of the cross legs 712A and 712B may aid to provide weapon support in different firing positions such the prone, sitting, kneeling, and standing positions. The friction buckle 706 of the upright legs 701 and 709 may not be required to be set at the same height as the buckle 706 of the opposing upright leg 701 or 709 so as to accommodate differing firing positions without requiring readjustment of the cross legs 712A and 712B. Weapon stability may be still achieved though application of pressure of the weapon into the weapon support platform 715.

Additionally, a ring connector (not shown) disposed at each terminus of the cross leg 712A and 712B may loop through a portion of a section of slack strap of upright legs 701 and 709. Said slack strap may be created by pulling a loop into the leg 701 and 709 as said leg passes through the friction buckle 706. When the slack strap is drawn tight, said friction buckle 706 may serve to lock the vertical position of the cross legs 712A and 712B in relation to the upright legs 701 and 709. By repositioning one or both friction buckles 706, the cross legs 712A and 712B may then be adjusted for height or angle of incidence with the upright legs 701 and 709. The cross legs 712A and 712B may thus lie normal to any upright legs 701 and 709 or at any angle incident to an upright leg 701 and 709 as preferred by the individual preference of a particular marksman or by other mission factors that may influence rig configuration.

A rig 700 may be installed in a cargo door opening of an aircraft, but may also be installed in openings formed by ramps, crew doors, or any other such opening. On the aircraft, a cargo door opening may be located in the fuselage to the rear of cockpit doors. The fuselage may be located beneath the rotor system.

The cross legs 712A and 712B may take the specific design and shape of any previously disclosed cross leg. Each cross leg 712A and 712B may be of the same configuration or a cross leg 712A or 712B may be of a differing configuration than the other cross leg 712A or 712B. While the rig 700 is illustrated with a pair of cross legs 712A and 712B, this configuration is meant to be exemplary. The quantity of cross legs that may be employed in the rig is limited solely by the amount of vertical space available in the upright legs 701 and 709. The actual quantity of cross legs to be deployed in a rig is determinant of the requirements of the mission to be performed and the afore mentioned space constraint as well as any other constraints imposed by the aircraft layout.

Figure 11:
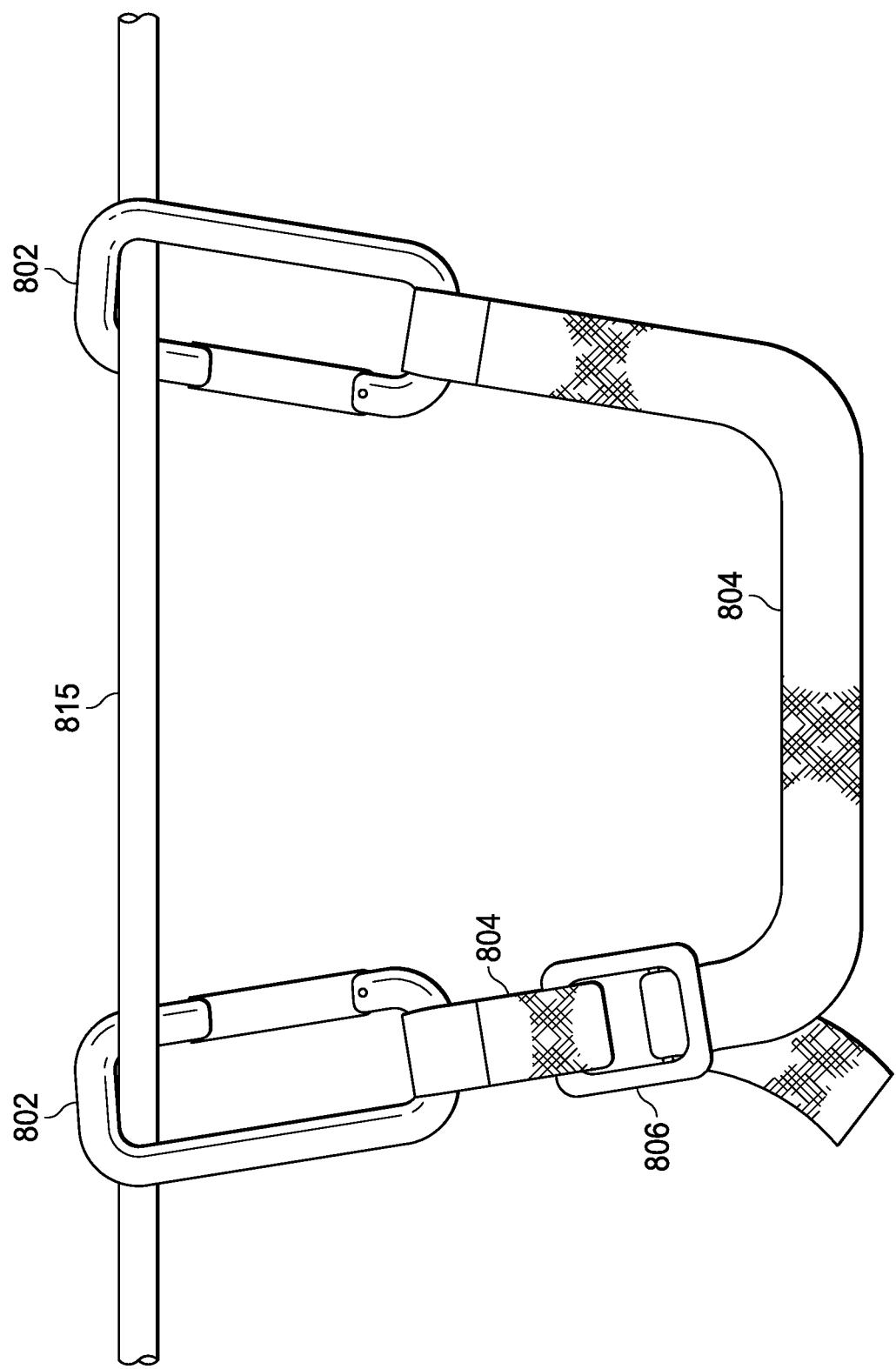
FIG. 11 illustrates a weapon sling incorporated into an aerial marksman rig.

Certain of the foregoing embodiments focus on resting a weapon on the upper surface of a rig member, usually the cross leg, and transiting the weapon along said surface. Such a method may not always prove to be the most optimal choice of employment, rather for operational conditions or personal preference of an individual marksman as the case may be. Thus, in some embodiments, a weapon sling 800 may be employed to support the weapon system. One embodiment of such a sling 800 is illustrated in FIG. 11. Such a sling 800 may be a length material, typically the same material as of which the strap members of the rig are composed, joined between an eyed connector 802 at each terminal end of the sling material 804. Said eyed connectors 802 may advantageously be carabiners to allow the sling 800 to be removable, but may also be a solid ring with the sling material 804 joined to the ring and the rig cross leg threaded through said connectors 802. Alternately, the eyed connector 802 may be a hook, preferably with a latch to close over the throat of the hook, wherein the rig cross leg, particularly the weapon stabilization platform section 815, passes through the throat of the hook and the sling material 804 is attached at the end of the hook opposing the throat. Additionally, the eyed connector 802 may be any connector that allows the sling 800 to transit along the length of the rig cross leg. Such a connector 802 should have an attachment site for the sling material 804 and an orifice through which the material of the weapon stabilization platform 815 may pass as the weapon is transited along the length of said platform 815.

The sling material 804 may have an adjustment buckle 806 disposed along the length of the sling material 804 so as to allow adjustment of the length of said sling 800. Such an adjustment buckle 806 may be a tri-bar slide buckle or other form of friction buckle. Such adjustment may allow adaption of the sling to individual needs arising from difference in physiology. Such adjustment may also allow for the sling to be modified based on the weapon system being employed. For example, a scoped marksman rifle may require a different offset from the cross leg than would be required by standard scoped rifle or a non-scoped weapon.

It is to be understood that, while hardware components of the rig have been shown to be disposed in particular locations relative to one another one inside a rig, any particular component may lie at alternate locations without loss of function or alteration of the intended design. For example, the sling 800 may be disposed on an upright leg of a rig, or on a horizontal leg of a rig.

For example, a tensioner may lie at the upper or lower end of an upright leg in an H-shape configuration rig. Tensioners and quick release devices may be disposed at either the left or right ends of a cross leg and lie in any order as relative to one another. In embodiments utilizing a single friction buckle, said friction buckle may be disposed at either the left or right terminus of the cross leg.

A rig may be stowed in an existing storage compartment of the vehicle. While inside such a compartment, the rig may be stored as loose components, components may be bound together, contained in sack or bag, or the components may be contained in a carrier designed specifically for the rig. The rig may also be stowed outside of a vehicle compartment such that it is readily accessible to those inside the vehicle. In such cases, the rig may be stored in manner such as described for storage inside of a compartment. It may be possible that the rig be deployed in the vehicle prior to the start of a mission. In such a case, any appropriate storage system, such as a case or storage bag, may be left at the vehicle's base of operations or may be brought with the rig should the need arise to remove the rig from the vehicle. Any storage device for the rig may be soft shelled or may be of a rigid construction. Such storage devices may resemble a bag or case design.

A method of utilizing a multi-leg aerial marksman rigs may be as follows. Said method uses a H-shaped rig being installed into a UH-1 aircraft for exemplary purposes. Also, henceforth the term forward will be used to designate items closer to the nose of the aircraft while rearward will designate toward the tail of the aircraft. The rig may first need to be installed into the aircraft. The upper forward 12-jaw connector may be mated to the receptacle on the ceiling of the aircraft. The lower forward hook connector is then secured to the cargo tie-down ring in the floor of the aircraft. With the forward upright leg now securely fastened to the aircraft, any excess slack in the leg may be remedied by manual manipulation of the tail of strap at the tensioner.

Next, the process is repeated for the rearward upright leg. Again, the upper and then lower connections are made to the aircraft and the leg is then drawn taut with the tensioner. With the vertical frame of the rig now in place, the horizontal cross leg is to be established.

First the desired position for the cross leg may be determined and set in place. The marksman may decide what is the most desirable shooting position for the current mission. Then, based on the selected shooting position, personal style, and considerations of physiology (height, torso length, arm length, etc.), the marksman may select at what height from the floor of the aircraft does the cross leg need to be set.

Assuming the desired height is not previously set on the rig, the marksman may transit the friction buckle on the forward upright leg to such a height as desired and then do so for the rearward upright leg. With the height for the cross leg set, the tensioner may then be used to remove any tension from the forward upright leg. The same is then done with the rearward upright leg. Finally, the slack is manually removed from the cross leg in the same manner as with the upright legs and the cross leg is brought taut with the tensioner. Finally, should the marksman opt to employ the weapon sling, the ring connectors of the sling may be opened and clipped over the weapon stabilization platform section of the cross leg.

With the rig installed and operationally ready, a marksman may then employ the rig as a stabilization platform for a weapon. If the weapon sling is not opted for use, then the weapon is placed on the upper surface of the weapon stabilization platform of the cross leg with either the weapon barrel or foregrip in contact with the rig. In some embodiments, a weapon may be braced against an upright leg. The marksman may then transit the weapon along the weapon stabilization platform to perform scans of an area. If a target is sited, the marksman may then terminate transiting the weapon so as to bring the weapon to bear on the selected target. Slight downward or other rig-engaging pressure may then be applied to the weapon to increase weapon stability and aid in preventing the weapon from sliding off target. Once whatever desired actions have been taken against the target, typically engagement or intelligence gathering, the marksman may return to the scanning mode of transiting the weapon along the weapon stabilization platform. The foregrip may also be known as the handguard, forestock, foreend, or other related nomenclature. The foregrip refers to any handhold intended to support the weight of the weapon forward of the hand that actuates the trigger of the weapon.

This downward or rig-engaging pressure may be applied through several different manners, depending on personal preference of the marksman or any other relevant factors. Firstly, the marksman may pull downward on the weapon with the hand at the rear of the weapon. This may pull the entire weapon downward, which may not be desirable. Alternately, the marksman may apply pressure to the forward section of the weapon by placing the non-trigger hand on top of the weapon and utilizing the forward hand as the force applier. Another force vector may be grasping any foregrip on the weapon and pulling downward on this foregrip. Such a method may be best suited for a weapon maintaining a forward pistol grip at the foregrip of the weapon.

Should the marksman opt for use of the weapon sling option of the rig, then when deemed appropriate and safe to do so by the marksman or others, the marksman may insert the weapon into the open loop of the sling. The sling may now replace the upper surface of the weapon stabilization platform as the contact point between the weapon and rig. With use of the sling, the operating principles remain the same as without the sling. The marksman may transit the weapon, now with the sling actually transiting the weapon stabilization platform rather than the surface of the weapon, through the arc required to cover the desired area. Upon target acquisition, again the marksman may apply downward pressure to prevent slippage of the sling along the weapon stabilization platform. This pressure may be released fully or partially to reconvene the scanning procedure. The application of a moderate amount of downward or rig-engaging force during weapon transit may also aid to increase weapon stability with the use of the aerial marksman rig. The implementation of such downward pressure may be determined by the personal preferences of the marksman, weapon selection, or other operational factors. Some other operational factors that may weigh in the choice of implementing said downward pressure may include the required speed of weapon transit. A marksman assigned a smaller area of responsibility may scan the assigned area at a slower pace while a marksman assigned a larger area may require higher rate of weapon transit. The quantity of targets in an area of responsibility may also influence the rate of weapon transit. For example, a marksman in an of high target density may be required to rapidly shift aim after each engagement while a marksman in an area of lower target density may afford more time to each shot and thus not be required to rapidly transit the weapon between engagements.

Employment of the weapon stabilization platform, or weapon stabilization platform and weapon sling, may benefit the marksman greater weapon stability, meaning the ability to maintain a proper target alignment through the weapon system sights. Such increased stability may be realized by the aerial marksman rig through the attenuation and damping of vibrations and movement transmitted to the weapon. Such vibrations and movement may include those introduced and transmitted by the aircraft or the marksman. Aircraft vibrations and transmitted movement may include those occurring from the aircraft propulsion system, air currents, turbulence, or other environmental factors affecting the aircraft. Vibrations and movement introduced by the marksman may mainly arise from muscle fatigue of the marksman. With the weapon stabilization platform bearing a portion of the weight of the weapon system, muscle fatigue of the marksman may be attenuated.

If for some reason quick departure from the aircraft through the opening in which the aerial marksman rig has been installed, then the marksman may engage the quick release located in the cross leg. Upon engagement of the quick release, the cross leg will separate into two sections that may then allow access to the aircraft opening. Once the opening is no longer required for ingress or egress, the marksman may rapidly reengage the quick disconnect and return to full operational status.

For situations in which more than one marksman may be operating out of a single aircraft opening, several options are available in how to employ the rig. The first option is that two or more may operate from the same weapon stabilization platform of the same cross leg. The weapon stabilization platform may be divided into sections or regions wherein each marksman will limit their weapon transit into the assigned region.

Another option for employing multiple marksman, is to employ a rig maintaining multiple cross legs. As each cross leg contains a weapon stabilization platform, each marksman will have a full and independent platform from which to operate. In such a scenario, each cross leg will be adjusted to the marksman employing the particular cross leg. Assignment of a cross leg to marksman may be driven by parameters such as personal preference of shooting position, physiological traits, operational conditions, and expertise and ability. For example, the taller of two marksmen may prefer the standing or kneeling position and thus indicating a cross leg at the upper height of the section of the rig would be appropriate while leaving the prone or sitting position to the shorter marksman.

Operational conditions may be used as a significant determining factor which style of rig is employed for a particular mission. A mission area expecting high turbulence or a significant amount of aircraft movement may preclude marksmen operating from the standing or kneeling position. Other operational factors may include whether the passenger cabin from which the marksman is operating is being shared with other occupants outside of the aircraft crewmembers.

For example, if a rifle squad is also inside of the cabin, the marksman may be severely limited on available space and thus restricted in shooting position options.

Finally, at the end of operations, the aerial marksman rig may be uninstalled from the aircraft. This process requires the disengagement of the points where the rig is mated to the aircraft. Such disengagement steps are to release tension from each upright leg by means of the tensioner of the associated leg and then release of the mating connector, rather 12-jaw connector, hook, carabiner, or other device as included for the specific rig configuration. The rig may then be further disassembled for maintenance and storage operations. This further disassembly may include removal of the weapon sling if the sling was implemented, and separation of the quick release in the cross leg. These steps will break the rig down into the main constituent sections and allow for easy cleaning, inspection, and storage.

In addition to solely enhancing weapon stability, an aerial sniper rig may advantageously increase the overall efficiency and efficacy of a marksman operating from an airborne platform. Most aircraft do not afford a marksman an opportunity to support the weapon with one hand, thus to utilize the non-trigger hand a marksman must support the weapon with an improvised support such as the knee or other field expedient object. Freeing use of the non-trigger hand while maintaining stable control of the weapon may allow the marksman to preform secondary operations without loss of aim on a target. Such secondary operations may be of vital importance such as relaying through a communication system any gathered intelligence, employing secondary devices such as handheld ballistic computers, or even reloading of the weapon system. Other secondary operation may include mundane actions that may be still be of vital importance to the marksman such as eating and hydrating. These and other operations that would require the marksman to lose focus on the situation or complete and accurate control of the weapon may become allowable without these losses of functionality through the stable support of the weapon afforded by the aerial marksman rig.

It is to be understood that, while hardware components have been shown to be disposed in particular locations relative to one another one inside a rig, unless obviously necessary any particular component may lie at alternate locations without loss of function or alteration of the intended scope of the disclosed subject matter. It is also to be noted that while some embodiments mention being fitted for or into particular aircrafts or families thereof, this is purely for exemplary purposes and is not intended to limit the use of the rig or a particular embodiment of the rig to a particular airframe, aircraft, or any particular family thereof.

Although the present disclosed subject matter and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. For example, although the disclosed apparatus, systems and methods may be described with reference to a manual or manually-activated pressure reduction valve, an electric valve or other automatic electronic or mechanical valve may be used to accomplish relatively rapid reduction of air pressure. Accordingly, the appended claims are intended to include within their scope such processes, machines, manufacture, compositions of matter, means, methods, systems or steps.

I claim:

1. An aerial marksman rig comprising:
a first upright support comprising:
a first releasable connector attached to a first end of a first length of flexible material, the first releasable connector configured for removably coupling to a rotor-wing aircraft at a first side of a door opening thereof at a first upper location;
a first releasable tensioner attached to a second end of the first length of flexible material and to the first end of a second length of flexible material, the first tensioner configured to releasably draw together the first length of flexible material and the second length of flexible material; and
a second releasable connector attached to the second end of the second length of flexible material, the second releasable connector configured for removably coupling to the rotor-wing aircraft at the first side of the door opening thereof at a first lower location;
a first friction buckle slidably coupled to the first upright support;
a second upright support comprising:
a third releasable connector attached to a first end of a third length of flexible material, the third releasable connector configured for removably coupling to the rotor-wing aircraft at a second side of the door opening thereof at a second upper location, the second side being opposite the first side;
a second releasable tensioner attached to the second end of the third length of flexible material and to the first end of a fourth length of flexible material, the second releasable tensioner configured to releasably draw together the third length of flexible material and the fourth length of flexible material; and
a fourth releasable connector attached to the second end of the fourth length of flexible material, the second releasable connector configured for removably coupling to the rotor-wing aircraft at the second side of the door opening thereof at a second lower location;
a second friction buckle slidably coupled to the second upright support; and
a first cross-support comprising:
a fifth length of flexible material, a first end of the fifth length of flexible material being attached to the first friction buckle and a second end of the fifth length of flexible material being attached to a third releasable tensioner; and
a sixth length of flexible material, a first end of the sixth length of flexible material being attached to the second friction buckle and a second end of the sixth length of flexible material being attached to the third releasable tensioner; and
the third releasable tensioner configured to releasably draw together the fifth length of flexible material and the sixth length of flexible material;
the first friction buckle being configured to lock against sliding when the first upright support is placed under tension and the second friction buckle being configured to lock against sliding when the second upright support is placed under tension, such that the first cross-support can support a firearm without sliding with respect to the first upright support or the second upright support.

2. The rig of claim 1, the second and fourth releasable connectors each comprising a snap hook.

3. The rig of claim 1, the first and third releasable connectors each comprising a jaw connector.

4. The rig of claim 1, the first, second, third, fourth, fifth and sixth lengths of flexible material each being a strap.

5. The rig of claim 1, the first, second and third tensioner each comprising a ratchet, a cam buckle or an elastic strap.

6. The rig of claim 1, further comprising heat-shrink tubing covering one or more portions of the first length of flexible material, the second length of flexible material, the third length of flexible material, the fourth length of flexible material, the fifth length of flexible material or the sixth length of flexible material.

7. The rig of claim 1, further comprising
a third friction buckle slidably coupled to the first upright support;
a fourth friction buckle slidably coupled to the second upright support;
a second cross-support comprising:
a seventh length of flexible material, a first end of the seventh length of flexible material being attached to the third friction buckle and a second end of the seventh length of flexible material being attached to a fourth releasable tensioner; and
an eighth length of flexible material, a first end of the eighth length of flexible material being attached to the fourth friction buckle and a second end of the eighth length of flexible material being attached to the fourth releasable tensioner; and
the fourth releasable tensioner configured to releasably draw together the seventh length of flexible material and the eighth length of flexible material;
the third friction buckle being configured to lock against sliding when the first upright support is placed under tension and the fourth friction buckle being configured to lock against sliding when the second upright support is placed under tension, such that the second cross-support can support a firearm without sliding with respect to the first upright support or the second upright support.

* * * * *

UNITED STATES PATENT AND TRADEMARK OFFICE
CERTIFICATE OF CORRECTION

PATENT NO. : 10,518,884 B1
APPLICATION NO. : 15/813005
DATED : December 31, 2019
INVENTOR(S) : Paul Butler Page 1 of 1

It is certified that error appears in the above-identified patent and that said Letters Patent is hereby corrected as shown below:

In the Specification

Column 4, Line 34, -aircraft 303- should be changed to --aircraft (not shown)--.

Column 4, Line 57, -aircraft 403- should be changed to --aircraft (not shown)--.

Column 5, Line 46, -uprights legs- should be changed to --upright legs--.

Column 5, Lines 51-52, -such the prone- should be changed to --such as the prone--.

Column 6, Line 40, -comprise of a tensioner- should be changed to --comprise a tensioner--.

Column 6, Line 64, -where in which the- should be changed to --wherein the--.

Column 7, Line 18, -uprights legs- should be changed to --upright legs--.

Column 9, Line 2, -uprights legs- should be changed to --upright legs--.

Column 10, Line 53, -uprights legs- should be changed to --upright legs--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*